(12) United States Patent
Sander et al.

(10) Patent No.: US 12,379,049 B2
(45) Date of Patent: Aug. 5, 2025

(54) VALVE CAGE FOR A CONTROL VALVE

(71) Applicant: SAMSON Aktiengesellschaft, Frankfurt am Main (DE)

(72) Inventors: Andreas Sander, Laudenbach (DE); Michael Merscher, Roedermark (DE)

(73) Assignee: SAMSON AKTIENGESELLSCHAFT, Frankfurt am Main (DE)

( * ) Notice: Subject to any disclaimer, the term of this patent is extended or adjusted under 35 U.S.C. 154(b) by 29 days.

(21) Appl. No.: 18/568,453

(22) PCT Filed: Jun. 3, 2022

(86) PCT No.: PCT/EP2022/065257
§ 371 (c)(1),
(2) Date: Dec. 8, 2023

(87) PCT Pub. No.: WO2022/258538
PCT Pub. Date: Dec. 15, 2022

(65) Prior Publication Data
US 2024/0271721 A1 Aug. 15, 2024

(30) Foreign Application Priority Data
Jun. 9, 2021 (DE) ...................... 20 2021 103 110.7

(51) Int. Cl.
*F16K 47/08* (2006.01)
*F16K 3/24* (2006.01)

(52) U.S. Cl.
CPC ............... *F16K 47/08* (2013.01); *F16K 3/24* (2013.01)

(58) Field of Classification Search
CPC . F16K 3/24; F16K 3/246; F16K 47/04; F16K 47/08; F16K 47/14
See application file for complete search history.

(56) References Cited

U.S. PATENT DOCUMENTS

| | | | |
|---|---|---|---|
| 3,990,475 A | 11/1976 | Myers | |
| 5,769,388 A | 6/1998 | Welker | |

(Continued)

FOREIGN PATENT DOCUMENTS

| | | | | |
|---|---|---|---|---|
| CN | 112594442 A | * | 4/2021 | ............ F16K 47/02 |
| CN | 116293072 A | * | 6/2023 | |

(Continued)

OTHER PUBLICATIONS

Machine English translation of CN_112594442_A (Year: 2025).*

(Continued)

*Primary Examiner* — Hailey K. Do
(74) *Attorney, Agent, or Firm* — Juan Carlos A. Marquez; Marquez IP Law Office, PLLC (57) ABSTRACT

A valve cage (100) for a control valve (10) incorporates a plurality of throttle channels (104) which extend from an inner contour of the valve cage (100) to its outer contour and penetrate the valve cage (100), each throttle channel (104) having an inlet opening (106) on the inner contour side and an outlet opening (110) on the outer contour side when viewed in the flow direction (S). When viewed in the circumferential direction (u), the valve cage (100) has a plurality of arcuate outer contour portions (112) which are each separated from one another via a step (114) acting as a tear-off edge, and the throttle channels (104) are arranged so that they extend such that the outlet openings (110) of the throttle channels (104) on the outer contour side are arranged in the step (114) between two outer contour portions (112).

20 Claims, 5 Drawing Sheets

(56) References Cited

U.S. PATENT DOCUMENTS

| | | |
|---|---|---|
| 6,250,330 B1 | 6/2001 | Welker |
| 6,701,957 B2 | 3/2004 | McCarty et al. |
| 6,935,370 B2 | 8/2005 | McCarty et al. |
| 6,935,371 B2 | 8/2005 | Stares |
| 7,013,918 B2 | 3/2006 | McCarty et al. |
| 9,759,348 B2 | 9/2017 | Adams et al. |
| 10,539,252 B2 | 1/2020 | Adams et al. |
| 10,871,243 B2 | 12/2020 | Sander et al. |
| 2017/0234440 A1 | 8/2017 | Detmers et al. |

FOREIGN PATENT DOCUMENTS

| | | |
|---|---|---|
| DE | 102015005611 A1 | 11/2016 |
| DE | 102016102756 A1 | 8/2017 |
| EP | 0875705 A2 | 11/1998 |
| JP | S59140973 A | 8/1984 |
| WO | 2003016767 A1 | 2/2003 |
| WO | 2003081097 A1 | 10/2003 |
| WO | 2016187246 A1 | 11/2016 |

OTHER PUBLICATIONS

Machine English translation of CN_116293072_A (Year: 2025).*
PCT International Preliminary Report on Patentability, mailed Dec. 14, 2023 n counterpart PCT application PCT/EP2022/065257, 6 pages in English.
PCT International Search Report mailed Sep. 16, 2022 in counterpart PCT application PCT/EP2022/065257, 2 pages in English.
PCT International Search Report and Written Opinion mailed Sep. 16, 2022 in counterpart PCT application PCT/EP2022/065257, 15 pages in German.
PCT International Preliminary Examination Report maled Nov. 17, 2022 n counterpart PCT application PCT/EP2022/065257, 7 pages in German.
German Search Report mailed Apr. 8, 2022 in counterpart German application DE20 2021 103 110.7, 3 pages in German.

* cited by examiner

VALVE CAGE FOR A CONTROL VALVE

This application is a national stage application filed under 35 U.S.C 371 of International Application No. PCT Application No. PCT/EP2022/065257 filed on Jun. 3, 2022. The disclosure of the above-referenced application is incorporated herein by reference in its entirety.

The invention relates to a valve cage for a control valve, and to a control valve of the type specified in the preamble of claim 20.

So-called cage valves, i.e. valves having a valve cage, are well known in the art and generally comprise a valve element which is movably supported in the cage valve housing in the axial direction a, and a valve cage that interacts with the valve element. The valve cage has multiple throttle channels that are arranged in such a way that the opening width of the valve cage, i.e. the number of closed or opened throttle channels and thus the throttle rate, can be set on the basis of the stroke position of the valve element. In addition to the valve cage, cage valves also have a valve seat that interacts with the valve element in a known manner and is designed to be complementary to the valve element, so that in the closed position, i.e. when the valve element rests on the valve seat, the valve is closed. Reference is made to DE 10 2015 005 611 A1 merely by way of example.

It is further known in the art that flow, pressure reduction and cavitation can be specifically influenced by an appropriate design of the throttle channels. In addition to a design of the associated inlet or outlet openings of the throttle channels as round, square or elongated holes with a straight or twisted throttle channel course over the entire length, see DE 10 2015 005 611 A1, throttle channels having a curved, inclined, conical and/or with edges and/or undercuts are also known, see DE 10 2016 102 756 A1.

It is the object of the invention to further develop a valve cage in such a way that an improved flow around the outside of the valve cage is achieved after a process fluid emerges from the throttle channels.

This object is accomplished by the characterizing features of claim 1 in conjunction with the features of its preamble. Dependent claims 2 to 19 relate to advantageous further embodiments of the throttle element according to the invention.

The essentially sleeve-shaped valve cage provided for a control valve comprises, in a known manner, multiple throttle channels extending from a cylindrical inner contour of the valve cage to its outer contour and penetrating the valve cage, i.e. the walls of the valve cage. When viewed in the flow direction S, each throttle channel thus has an inlet opening on its inner contour side, an adjoining channel portion and an outlet opening on its outer contour side.

The invention now provides for the valve cage, when viewed in the circumferential direction u, to have multiple arcuate or convex outer contour portions which are separated from one another by a step acting as a tear-off edge when viewed in the flow direction S.

The phrase 'separated from one another by a step acting as a tear-off edge' is to be understood in particular as meaning that a step is formed between two adjacent outer contour portions that is aligned essentially vertically, i.e. in the radial direction r, in relation to the lateral surface of the respective outer contour portions. Because the edge resulting from the step is known to cause the flow to tear off, this edge is also referred to as the tear-off edge.

Moreover, the invention provides for the throttle channels to be arranged in such a way that the outlet openings of the throttle channels on the outer contour side are located in the step between two outer contour portions. In other words, the throttle channels each open in the step formed between two adjacent outer contour portions and aligned essentially vertically, i.e. essentially in the radial direction r, in relation to the lateral surface of the respective outer contour portions.

The positioning or arrangement of the outlet openings in the step according to the invention between two outer contour portions that are arcuate, or convex when viewed in the direction of flow S, has the effect that, due to the Coanda effect or Van der Waals forces, the process fluid emerging from the outlet openings 'clings' to the arcuate outer contour portion that follows when viewed in the direction of flow S and flows along it. This means that the upstream process fluid flows emerging from the outlet openings are guided in a 'close-fitting' manner and thus in an arc shape to the following downstream tear-off edge or step. The tear-off edge in turn has the effect of causing the flow to deliberately 'tear off', preventing the upstream and downstream process fluid flows from crossing and thus preventing turbulence. The design according to the invention thus proves to be particularly advantageous, because, as a result of the close-fitting and turbulence-reduced flow guidance, improved flow around the outside of the valve cage and thus optimized flow deflection can now be ensured.

Preferably, several outlet openings arranged in series in the axial direction a are arranged or provided in the step between two outer contour portions. Alternatively, it is conceivable for the cage valve to only have one throttle channel for each step, which throttle channel is formed in particular over a large part of the valve body's axial extension.

In order to ensure an almost tangential outflow along the arcuate outer contour portion, and thus enable optimum utilization of the Coandă effect, a particularly advantageous embodiment of the invention provides for the outlet openings arranged in a row to each be aligned tangentially adjacent to the adjoining, when viewed in the flow direction S, arcuate outer contour portion.

In an alternative design for optimum utilization of the Coandă effect, a slot extending in axial direction a is formed in the step, into which the outlet openings arranged in series open, which slot is aligned tangentially adjacent to the adjoining (as viewed in flow direction S) arcuate outer contour portion.

In another advantageous embodiment of the invention, the valve cage has an even number n of steps and arcuate outer contour portions when viewed in the circumferential direction u.

As initial tests have shown, the results are optimized with regard to the intended flow deflection if the number n of steps and the number of the arcuate outer contour portions is selected such that $$6 \leq \text{number } n \leq 40.$$

Yet another, particularly advantageous embodiment of the valve cage according to the invention is characterized by the fact that the n arcuate outer contour portions and the n steps are arranged axially symmetrically to an axis of symmetry aligned perpendicular to the direction in which the valve cage, which is essentially sleeve-shaped, extends. In other words, viewed from above, the valve cage has two identical halves, with the effect that the process fluid is guided clockwise around the valve cage in one half of the valve cage and counterclockwise in its other half, so that the process fluid emerging from the outlet openings is always guided around the valve cage along the shortest path.

To ensure that the process fluid emerging from the outlet openings already has a curved flow path that essentially corresponds to the arcuate outer contour portion, another preferred embodiment of the valve cage according to the invention provides for the throttle channels—starting from their inlet openings on the inner contour side to the outlet openings on the outer contour side—to be designed to have a curved course.

Preferably, the channel portions have a circular channel cross-section. However, channel cross-sections of a shape other than circular are also conceivable, in particular oval or polygonal channel cross-sections with rounded corners.

Another particularly preferred embodiment of the valve cage according to the invention is characterized in that the throttle channels are designed to have a channel cross-section which continuously decreases from the inlet openings to the outlet openings. The continuously decreasing channel cross-section has the effect that the process fluid velocity increases as it flows through. As the Coandă effect correlates with the flow velocity (=>the higher the flow velocity, the more pronounced the Coanda effect), this advantageously allows for optimized utilization of the Coandă effect.

Preferably, the throttle channels are each designed to be arcuate in an outflow direction, whereby in particular a process fluid flow direction at an inlet opening of a throttle channel is different from a flow direction at an outlet opening of the respective throttle channel. For example, the throttle channels have a sharp bend, or a curved, in particular partially circular or partially elliptical, basic shape. Preferably, the throttle channels each have a substantially straight or uniformly curved shape in the area of their outlet opening, which shape in particular corresponds substantially to a shape or curvature of the outer contour portion adjacent to the respective outlet opening. It is conceivable for the throttle channels to have a curved, winding, for example helical or sinusoidal, shape, or another more complex shape in the area of their inlet opening, in particular to optimize the flow behaviour.

Furthermore, it is proposed that the throttle channels have essentially the same length. A flow resistance that is advantageously evenly distributed over the throttle channels can be achieved. This enables an advantageous flow behavior of process fluid through the valve cage, in particular the throttle channels. In particular, the length of each of the throttle channels corresponds to an intended distance for process fluid flowing through the respective throttle channel, centered through the respective throttle channel from the inlet opening of the respective throttle channel to the outlet opening of the respective throttle channel. Preferably, the length of the throttle channels is at least greater than a wall thickness of the valve cage, preferably at least in the area of the throttle channels, which in particular extends essentially perpendicular to the axial direction or radially to a central axis of the valve cage.

In addition, it is proposed that the valve cage has an essentially hollow cylindrical basic shape with an at least essentially circular outer contour when viewed along an axial direction a, in particular the aforementioned axial direction a, wherein the outlet openings of the throttle channels and/or the steps each acting as a tear-off edge are arranged essentially on the outer contour of the valve cage when viewed along the axial direction (a). This allows an advantageous flow behavior of process fluid to be achieved, which latter is guided around the valve cage after the throttle channels. An advantageously uniform load and wear of the valve cage can be achieved. In particular, the curvature of each of the outer contour portions is different from the at least essentially circular outer contour of the valve cage. The phrase 'the outlet openings of the throttle channels and/or the steps which each act as a tear-off edge, are arranged essentially on the outer contour of the valve cage when viewed along the axial direction (a)' is to be understood as meaning that the outlet openings and/or steps are each arranged at a minimum radial distance from the outer contour of the valve cage in a plane extending perpendicular to the axial direction with respect to a center point of the at least substantially circular outer contour, which radial distance is at most 10%, preferably at most 5%, and particularly preferably at most 3%, of a radius of the outer contour.

It is further proposed that the throttle channels are each bent in an outflow direction, wherein the valve cage has at least one outflow edge arranged on an outer side of the valve cage formed in the outflow direction, which outflow edge delimits at least one of the outer contour portions viewed along a circumferential direction u, in particular the aforementioned circumferential direction u, and is arranged at a distance from the steps, which outflow edge is preferably provided to cause a flow guided along the respective outer contour portion to break off in the outflow direction. Undesired vortex formation in the process fluid on the outer side formed in the outflow direction, which can potentially arise due to the flows being guided towards each other at the outer contour portions, can thus be advantageously prevented. An advantageous directional guidance of process fluid guided on the outside of the valve cage in the direction of the valve outlet can be achieved. In particular, the outflow direction corresponds to the flow direction of a process fluid, especially after flowing through the valve cage, on the way from the valve cage to the valve outlet. Preferably, the outflow direction is essentially parallel to the axis of symmetry or essentially perpendicular to the axial direction. Preferably, the outer side of the valve cage formed in the outflow direction is the side of the valve cage that faces the valve outlet, particularly when the valve cage is mounted.

Preferably, the outflow edge arranged on the outside extends along the axial direction at least over an area of the valve cage that includes the outlet openings of the throttle channels. Preferably, the outflow edge extends over a substantially complete length of the outflow edge and/or extends at least substantially straight along the axial direction at least in the area of the outlet openings and/or extends at least substantially parallel to the axial direction. Preferably, the outflow edge is arranged essentially on the axis of symmetry, especially when viewed along the axial direction, or the valve cage has more than one outflow edge, for example two or three outflow edges, which are arranged symmetrically on the outside with respect to the axis of symmetry. If the valve cage is designed to have an outflow edge that is essentially arranged on the axis of symmetry, for example with one outflow edge or three or an odd number of outflow edges, it is conceivable for the valve cage to be essentially teardrop-shaped on the outside, with side surfaces of the valve cage, which in particular run flush out of adjacent outer contour portions, converging towards the outflow edge.

Furthermore, it is proposed that the valve cage has two outflow edges arranged on the outside of the valve cage, which is formed in the outflow direction, which, when viewed along the circumferential direction u, each delimit one of the outer contour portions and together, in particular on two opposite sides, delimit an outer surface of the valve cage, which is formed angled away from the outer contour portions via the two outflow edges. Undesired vortex formation in the process fluid on the outside formed in the outflow direction can be advantageously prevented, which vortex formation can potentially arise as a result of the flows being guided towards each other at the outer contour portions, in particular since the flows guided on the different sides of the valve cage are guided away from the valve cage separately from each other at the two outflow edges. An advantageous directional guidance of process fluid guided on the outside of the valve cage in the direction of the valve outlet can be achieved, whereby an advantageously compact design of the valve cage can also be achieved. Preferably, the two outflow edges arranged on the outside each extend along the axial direction at least over an area of the valve cage which comprises the outlet openings of the throttle channels. Preferably, the two outflow edges each extend over an essentially complete length of the respective outflow edge and/or at least substantially straight along the axial direction at least in the area of the outlet openings, and/or at least substantially parallel to the axial direction. In particular, the two outflow edges, preferably at least in the area of the outlet openings, are at least substantially parallel to one another. Preferably, the two outflow edges have essentially the same minimum distance to the axis of symmetry when viewed along the axial direction. Preferably, the outer surface has a shape or curvature that is different from the two adjacent outer contour portions, particularly when viewed along the axial direction. In a preferred embodiment, the outer surface is essentially flat. Preferably, the outer surface extends essentially perpendicular to the axis of symmetry of the valve cage. In particular in a design of the valve cage with more than two outflow edges, it is conceivable for the valve cage to have more than one outer surface, which surfaces are preferably arranged between two of the outflow edges when viewed along the axial direction. It is conceivable for two of the outer surfaces to correspond to the above-mentioned side surfaces of the valve cage, which converge in a teardrop shape to form one of the outflow edges.

Moreover, it is proposed that the valve cage comprises at least one additional throttle channel which is formed substantially symmetrically with respect to an axis of symmetry of the valve cage, in particular the aforementioned axis of symmetry, and is arranged at a distance from the steps and the throttle channels, wherein the at least one additional throttle channel extends from an inner side of the valve cage to an outer side of the valve cage, in particular the aforementioned outer side, which is formed in the downstream direction, wherein the at least one additional throttle channel is preferably provided to generate a flow directed in the downstream direction. An advantageous directional guidance of process fluid guided on the outside of the valve cage in the direction of the valve outlet can be achieved, as process fluid guided from two sides on the outer contour portions can be carried in the direction of the valve outlet by process fluid guided via the additional throttle channel. It is conceivable for the valve cage to comprise one or more additional throttle channels. The wording that the throttle channel(s) is/are designed 'essentially symmetrical to the axis of symmetry of the valve cage', is intended to mean in particular that a volume of the additional throttle channel(s) forming the additional throttle channel(s), in particular bounded by the base body of the valve cage, is arranged evenly distributed on both sides of the axis of symmetry when viewed along the axial direction. For example, the valve cage comprises an additional throttle channel which, when viewed along the axial direction, runs essentially on or around the axis of symmetry, two additional throttle channels which, when viewed along the axial direction, have an essentially equal minimum distance to the axis of symmetry, or three additional throttle channels, whereby one of the three additional throttle channels, when viewed along the axial direction, runs essentially on or around the axis of symmetry, and two of the three additional throttle channels, when viewed along the axial direction, have an essentially equal minimum distance to the axis of symmetry. In a preferred embodiment of the invention, the at least one/the additional throttle channel(s) and the throttle channels are of essentially the same length. In particular, it is conceivable for the at least one additional throttle channel to have a curved, coiled, for example helical, sharply bent or sinusoidal basic shape. However, it is also conceivable for the at least one additional throttle channel to be of an at least essentially straight design. For example, it is conceivable for the valve cage to have a greater wall thickness in the area of the outer side or the at least one additional throttle channel than in an area in which the throttle channels are arranged. The at least one additional throttle channel preferably has an inlet opening and an outlet opening. Alternatively, it is conceivable for the at least one additional throttle channel to have more than one inlet opening and/or more than one outlet opening, whereby in particular an average length through the additional throttle channel essentially corresponds to a length of the throttle channels. In particular, the outlet opening(s) of the at least one additional throttle channel is/are arranged on the outside, preferably on the/one outer surface of the valve cage, in particular the one previously mentioned. Alternatively or additionally, it is conceivable for an outlet opening of an/the additional throttle channel to form at least one outflow edge, with the outlet opening in particular bordering on at least one of the outer contour portions.

Preferably, the valve cage is produced in layers in an additive manufacturing method, in particular a laser sintering method or a laser melting method, in which a selective material application process or a selective material curing process is controlled on the basis of the specific geometric data of the valve cage. The advantage of producing the valve cage using an additive manufacturing process is that, in addition to fast production (no time-consuming development/production of tools/molds needed), complex geometries and structures can also be implemented easily and cost-effectively.

In an alternative embodiment of the invention, the valve cage is produced in a casting process.

Preferably, the valve cage manufactured using an additive manufacturing method or a casting method is made of metal or a metal alloy.

Furthermore, it is the object of the invention to further develop a control valve for a process plant of the type specified in the preamble of claim 20 in such a way that operation of the control valve is optimized in terms of cavitation and wear.

This object is accomplished by the characterizing features of claim 20 in conjunction with the features of its preamble.

In a known manner, the control valve comprises a valve housing with a valve inlet and a valve outlet, a valve cage disposed between the valve inlet and the valve outlet, as well as a throttle element which is movably supported in the valve housing and interacts with the valve cage.

The present invention now provides for the throttle element to be of the design specified in any one of claims 1 to 19.

Since the design of the valve cage means that the process fluid emerging from the outlet openings of the valve cage now flows closely around the valve cage, it is ensured that the process fluid flows no longer impact normally or vertically on the surrounding walls of the valve housing, so that the impact energy of the process fluid flows when they hit the housing walls is significantly reduced, which in turn advantageously results in a reduced tendency to cavitation and wear.

Additional advantages, features and possible applications of the present invention will be apparent from the description which follows, in which reference is made to the embodiments illustrated in the drawings.

Throughout the description, the claims and the drawings, those terms and associated reference signs are used as are stated in the list of reference signs below. In the drawings.

Figure 1:
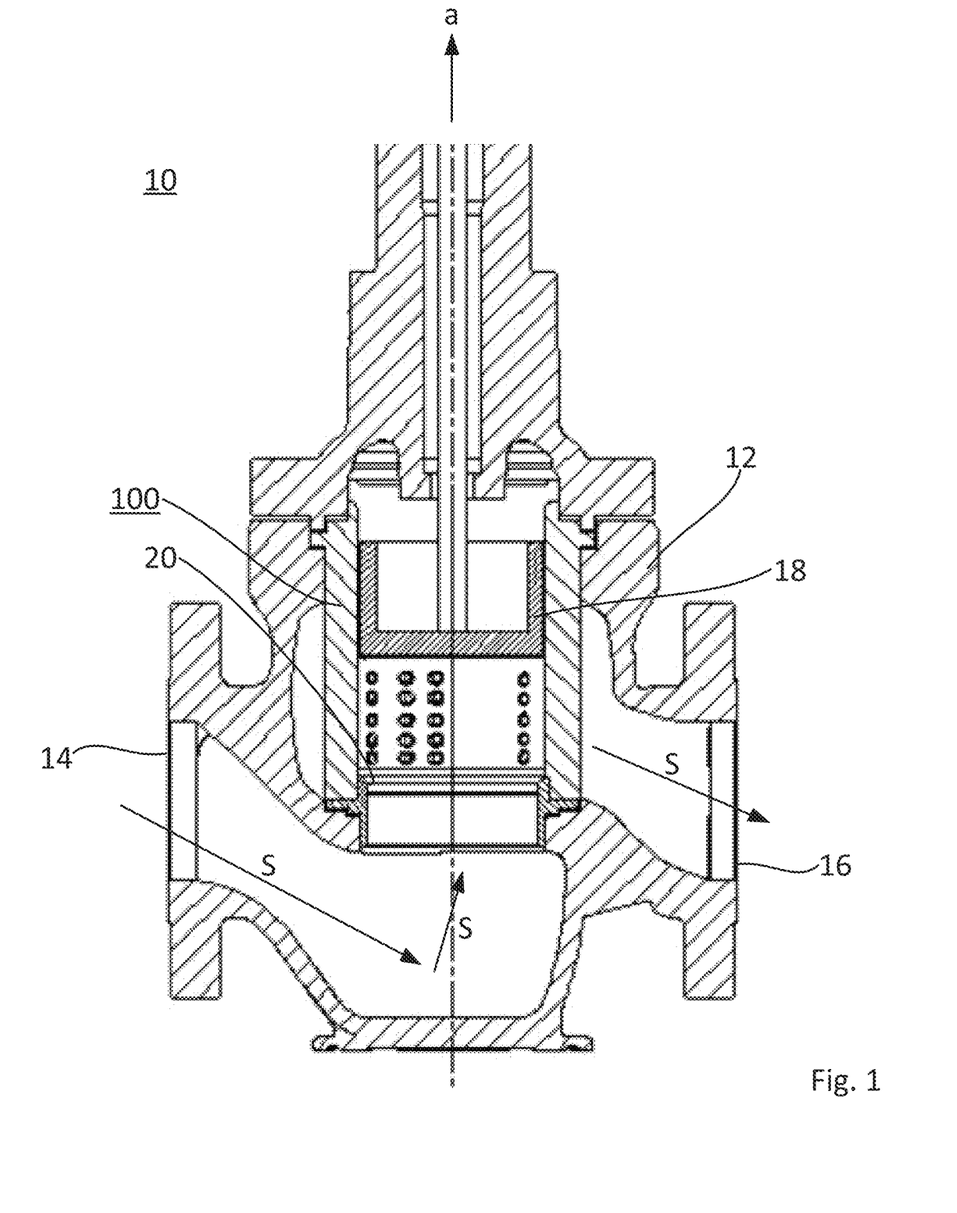
FIG. 1 is a sectional view of a control valve with a valve cage according to the invention.

The view of FIG. 1 shows a control valve for a process plant, which valve is designated in its entirety by the reference numeral 10. The control valve 10 comprises a valve housing 12 with a valve inlet 14 and a valve outlet 16, a valve element 18 which is movably supported in the valve housing 12 of the control valve 10 in the axial direction a, and an essentially sleeve-shaped or cylindrical valve cage 100 which is disposed in the flow channel of the valve housing 12, i.e. between the valve inlet 14 and the valve outlet 16. Control valves of this type which have a valve cage are also referred to as cage valves.

Figure 2:
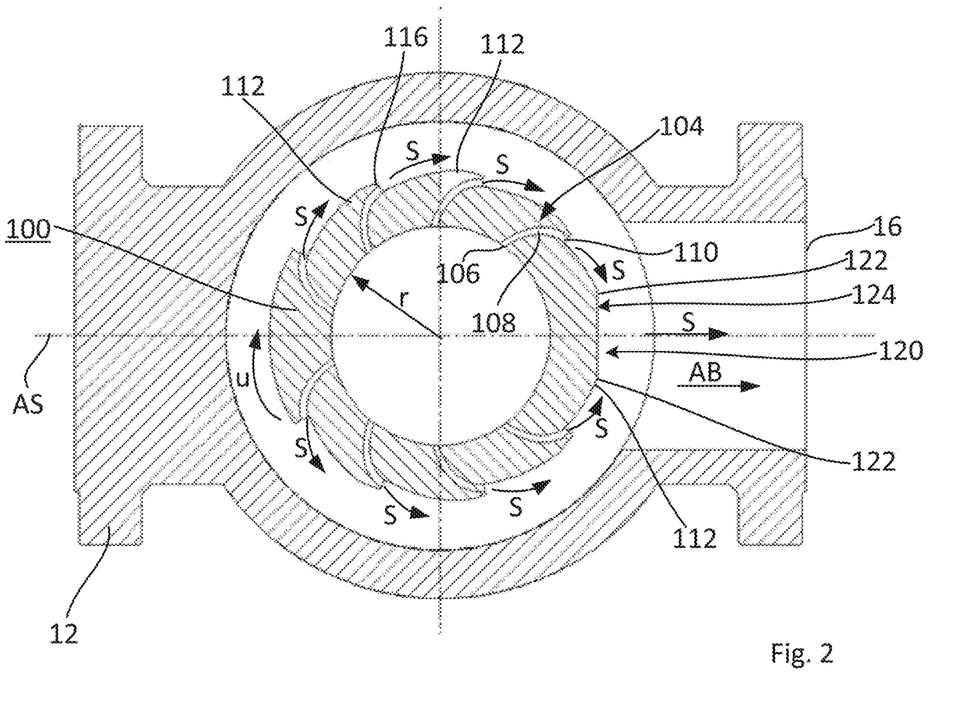
FIG. 2 is a cross-sectional view of the control valve of FIG. 1.

The sleeve-shaped or cylindrical valve cage 100 comprises an upper guide region, viewed in axial direction a, which guides the valve element 18 in the axial direction, and a throttle region located underneath, which has multiple throttle channels 104 that are arranged in a distributed manner viewed in the axial direction a and in the circumferential direction u and which extend through the walls of the valve cage 100, see FIG. 2. As can be further seen in FIG. 2, each throttle channel 104 has an inlet opening on the inner contour side designated by the reference numeral 106, a channel portion designated by the reference numeral 108, and an outlet opening on the outer contour side designated by the reference numeral 110.

As shown in FIGS. 1 and 2 by the arrows symbolizing the direction of flow S, a process fluid enters the control valve 10 via the valve inlet 14 and flows into the interior of the valve cage 100 via the lower end face. The process fluid enters the channel portions 108 via the inlet openings 106 on the inner contour side, and then emerges from the throttle channels 104, and thus the valve cage 100, via the outlet openings 110 on the outer contour side, before flowing out of the valve outlet 16 from the control valve 10.

The number of closed or opened throttle channels 104, i.e. the opening width of the valve cage 100 and hence the throttle rate, can thus be adjusted in a known manner by appropriately axially positioning the valve element 18 in relation to the valve cage 100.

To completely close the control valve 10, the control valve 10 further comprises a valve seat 20 which interacts with the valve element 18 and is designed complementary to the valve element 18.

A known problem of this type of control valve 10 with a valve cage 100 is that, in order to reduce the tendency to cavitation and wear, a vertical or normal impingement of the process fluid flows emerging from the outlet openings 110 on the surrounding walls of the valve housing 12 should be avoided as far as possible.

Figure 3:
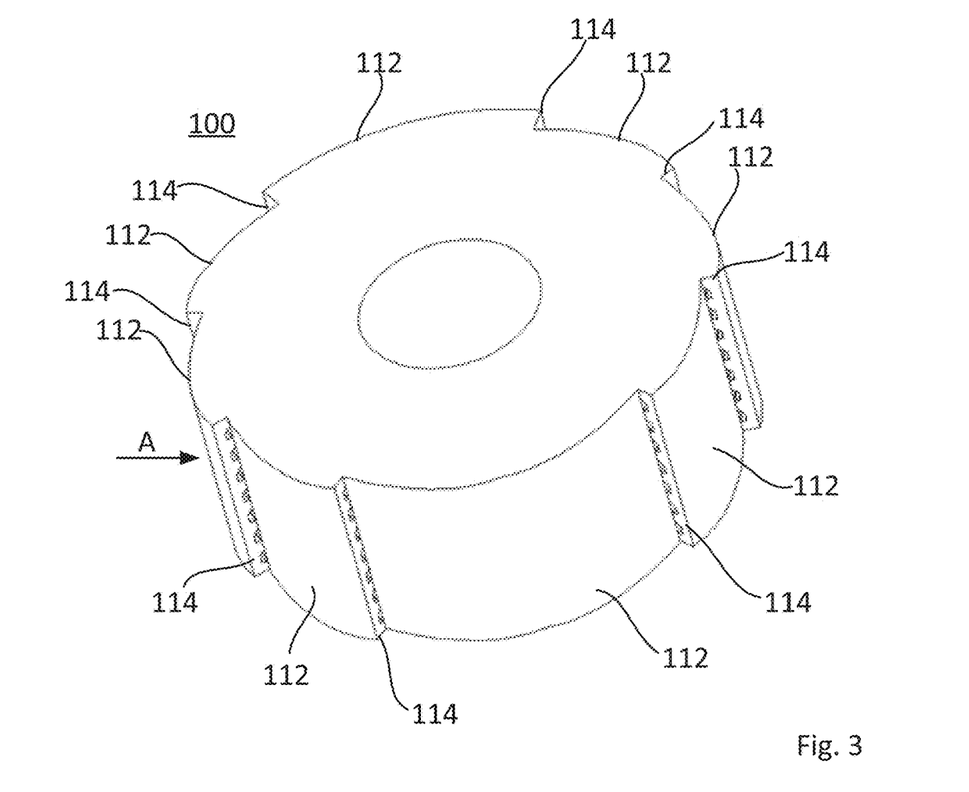
FIG. 3 is a view, taken at an angle from above, of the throttle area of a valve cage according to the invention, in a first embodiment thereof.
Figure 5:
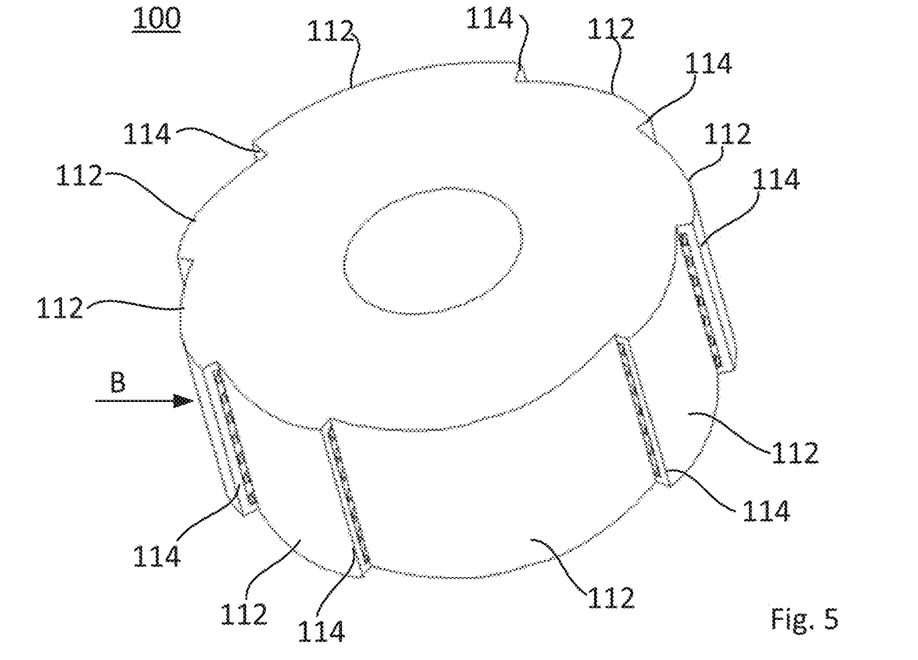
FIG. 5 is a view, taken at an angle from above, of the throttle area of a valve cage according to the invention, in a second embodiment thereof.

As can be seen from FIGS. 2, 3 and 5, for this purpose, the invention provides for the outer lateral surface of the valve cage 100 to be stepped, i.e. that, when viewed in the circumferential direction u, the valve cage 100 has multiple arcuate outer contour portions 112, which are separated from one another by a step 114 acting as a tear-off edge in the direction of flow S. In addition, as can be further seen from FIGS. 2, 3 and 5, the throttle channels 104 are arranged in such a way that the outer contour-side outlet openings 110 of the throttle channels 104 are each located in or arranged within the steps 114, forming a row in the axial direction a.

This design proves to be particularly advantageous, as the process fluid flows are now initially guided in an arc to the respective downstream stage 114 after emerging from the outlet openings 110, as a result of the Coanda effect. In other words, the process fluid flows follow the respective arcuate outer contour portion 112. The subsequent step 114, which acts as a tear-off edge, then causes the flow to deliberately tear off, thus preventing turbulence caused by intersecting process fluid flows. As a result, in addition to reduced turbulence in the flow, a close flow around the valve cone 100 in relation to the outer circumferential surface of the valve cone 100 is ensured in an advantageous manner.

As can be seen in FIGS. 2, 3 and 5, n=8 arcuate outer contour portions 112 and n=8 steps 114 are provided in the present case. In addition, as can be seen in particular in FIG. 2, the throttle channels 104 are designed in such a way that they have a curved course starting from their inlet openings 106 on the inner contour side to the outlet openings 110 on the outer contour side. The advantage of this design is that the process fluid flows emerging from the outlet openings 110 on the outer contour side now already have a curved flow path that essentially corresponds to the arcuate outer contour portion 112.

In addition, as is further seen in FIG. 2, the valve cage 100 is axially symmetrical to the axis of symmetry designated AS, i.e.—as can be seen in the top view of FIG. 2—the valve cage 100 has two identical halves, namely an upper half and a lower half—based on the plan view in FIG. 2. This in turn has the effect that process fluid emerging from the outlet openings 110 in the upper half is guided clockwise around the valve cage 100, while process fluid emerging from the outlet openings 110 in the lower half is guided counterclockwise around the valve cage 100. This ensures that the process fluid emerging from the outlet openings 110 is always guided around the valve cage 100 along the shortest path.

Figure 4:
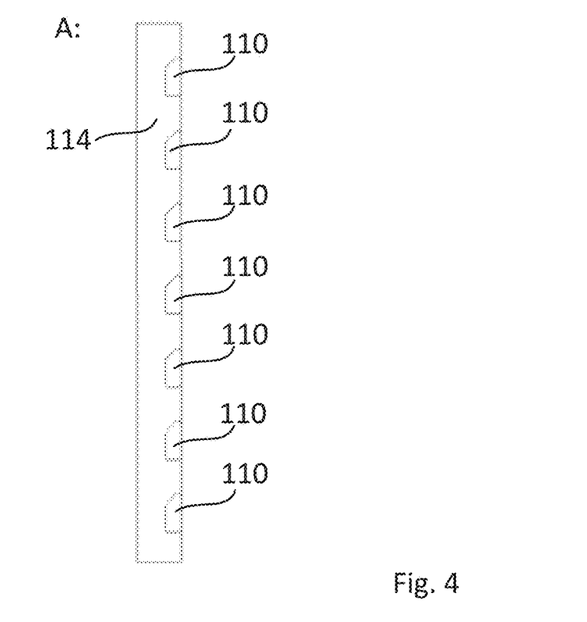
FIG. 4 is an enlarged view of the area marked A of FIG. 3.

In order to ensure an almost tangential outflow along the adjoining arcuate outer contour portion 112 and thus enable optimum utilization of the Coanda effect, in the first embodiment of the invention, see FIGS. 3 and 4, the outlet openings 110, each arranged in a row, are designed in such a way that the outlet openings 110 are aligned tangentially adjacent to the adjoining arcuate outer contour portion 112 when viewed in the flow direction S.

Figure 7:
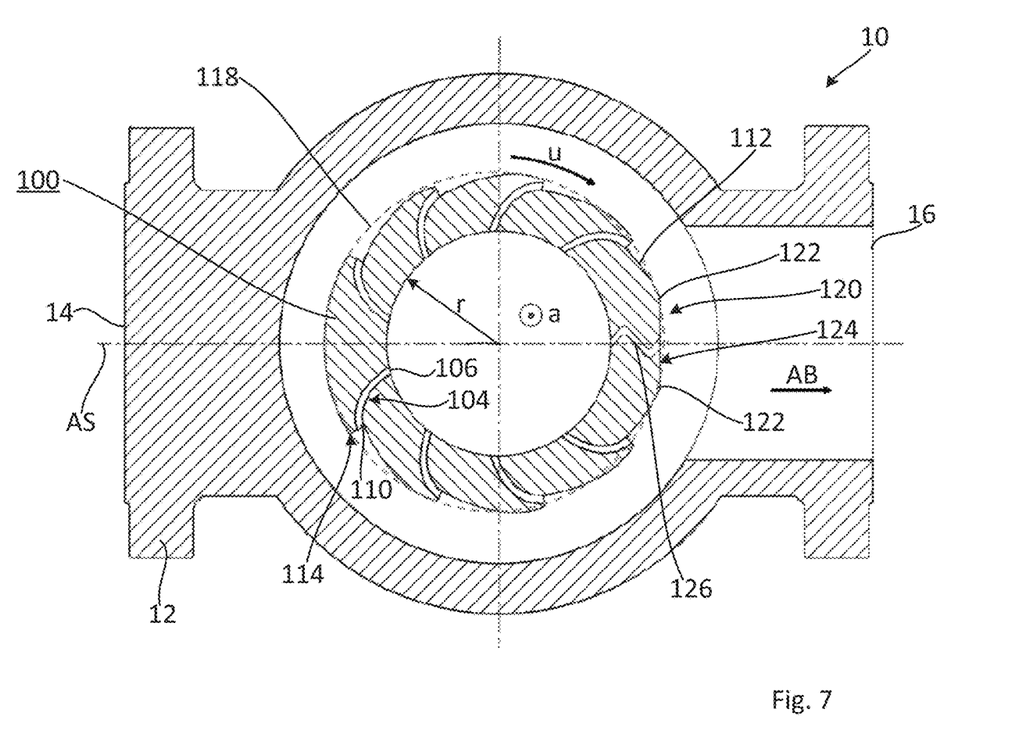
FIG. 7 is a cross-sectional view of the control valve of FIG. 1 with a valve cage according to the invention, in a third embodiment thereof.

The throttle channels 104 of the valve cage 100 are all of essentially the same length, in particular de-spite slightly different basic shapes (see in particular FIGS. 2 and 7). The length of the throttle channels 104 is greater than an average wall thickness of the valve cage 100, and greater than a wall thickness of the valve cage 100 in the area of the throttle channels 104. The wall thickness of the valve cage 100 extends essentially perpendicular to the axial direction a, or radially to a central axis of the valve cage 100.

The valve cage 100 has a substantially hollow-cylindrical basic shape with an outer contour 118 that is at least substantially circular when viewed along an axial direction a, wherein the outlet openings 110 of the throttle channels 104 and the steps 114, each acting as a tear-off edge, are arranged substantially on the outer contour 118 of the valve cage 100 when viewed along the axial direction a. The outer contour portions 112 each have a different curvature from the at least substantially circular outer contour 118 of the valve cage 100. The outlet openings 110 and/or the steps 114 each have, in a plane extending perpendicular to the axial direction a, a minimum radial distance from the outer contour 118 of the valve cage 100 with respect to a center point of the at least substantially circular outer contour 118, which minimum radial distance is at most 10%, preferably at most 5% and particularly preferably at most 3%, of a radius of the outer contour 118.

FIG. 2 shows the valve cage 100 having two outflow edges 122 and an outer surface 124 bounded by the two outflow edges 122, which latter are in particular not shown in FIGS. 3 to 6. The throttle channels 104 are each bent in an outflow direction AB, with the valve cage 100 having the two outflow edges 122 arranged on the outer side 120 of the valve cage 100, which is formed in the outflow direction AB. When viewed along the circumferential direction u, the two outflow edges 122 each delimit one of the outer contour portions 112. The two outflow edges 122 are each arranged at a distance from the steps 114. The outflow edges 122 are intended to cause a flow guided along the outer contour portion 112 bordering the respective outflow edge 122 to tear off in the downstream direction AB. The two outflow edges 122 together delimit, in particular on two opposite sides, the outer surface 124 of the valve cage 100, which is formed angled away from the outer contour portions 112 via the two outflow edges 122. The outer surface 124 is arranged on the outer side 120 of the valve cage, which is formed in the outflow direction AB. The outflow direction AB corresponds to the flow direction of a process fluid, in particular after flowing through the valve cage 100, on the path away from the valve cage 100 towards the valve outlet 16. The outflow direction AB is essentially parallel to the axis of symmetry AS and essentially perpendicular to the axial direction a. The outer side 120 of the valve cage 100, which is formed in the outflow direction AB, is the side of the valve cage 100 that faces the valve outlet 16, in particular in a mounted state of the valve cage 100 (see FIG. 2). The outflow edges 122 arranged on the outer side 120 each extend along the axial direction a at least over an area of the valve cage 100, which comprises the outlet openings 110 of the throttle channels 104. The two outflow edges 122 each extend over a substantially complete length of the respective outflow edge 122 and/or along the axial direction a, at least in the region of the outlet openings 110, at least substantially straight and at least substantially parallel to the axial direction a. The two outflow edges 122 are arranged symmetrically on the outer side 120 with respect to the axis of symmetry AS. The two outflow edges 122 are formed substantially parallel to each other, preferably at least in the area of the outlet openings 110. When viewed along the axial direction a, the two outflow edges 122 are spaced at a substantially equal minimum distance from the axis of symmetry AS. The outer surface 124 has a shape or curvature which is different from the two adjacent outer contour portions 112, particularly when viewed along the axial direction a. The outer surface 124 is essentially flat. Alternatively, it is conceivable for the outer surface 124 to also be curved. The outer surface 124 extends substantially perpendicular to the axis of symmetry AS of the valve cage 100. Alternatively, designs of the valve cage 100 are also conceivable, in which the valve cage 100 has only one outflow edge 122, in particular without the outer surface 124, or more than two outflow edges 122.

Figure 6:
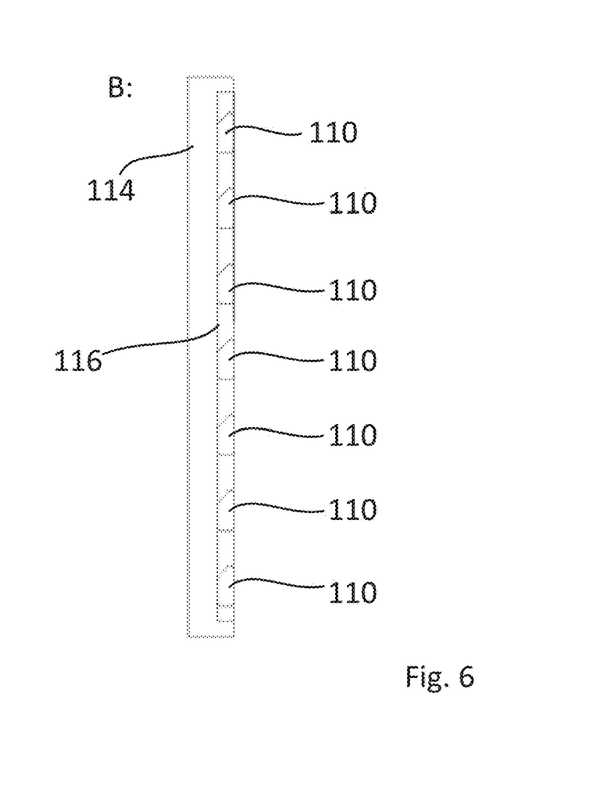
FIG. 6 is an enlarged view of the area marked B of FIG. 5.

In the second embodiment of the invention, see FIGS. 5 and 6, a slot 116 extending in the axial direction a is formed in the step 114, into which the outlet openings 110 of the throttle channels 104, arranged in a row, open. In order to ensure an almost tangential outflow along the adjoining arcuate outer contour portion 112 in this case as well and thus enable optimum utilization of the Coanda effect, the slot 116 is designed such that it is aligned tangentially adjacent to the adjoining arcuate outer contour portion 112 as viewed in the flow direction S.

FIG. 7 shows a control valve 10 with a valve cage 100 according to a third embodiment of the invention. The valve cage 100 of FIG. 7 is essentially identical to the valve cage 100 of FIG. 2. The valve cage 100 of FIG. 7 differs from the valve cage 100 of FIG. 2 in that it has an additional throttle channel 126. The additional throttle channel 126 is formed substantially symmetrically to the axis of symmetry SA of the valve cage 100 and is arranged at a distance from the steps 114 and the throttle channels 104. The additional throttle channel 126 extends from an inner side of the valve cage 100 to the outer side 120 of the valve cage 100, which is formed in the outflow direction AB. The additional throttle channel 126 is intended to generate a flow directed in the outflow direction AB, which in particular guides process fluid towards the valve outlet 16. The additional throttle channel 126 has a convoluted basic shape. The additional throttle channel 126 extends essentially in a sinusoidal manner from the inner side of the valve cage 100 to the outside 120. When viewed along the axial direction a, the additional throttle channel 126 extends essentially around or along the axis of symmetry AS. The additional throttle channel 126 is of essentially the same length as the throttle channels 104. An outlet opening of the additional throttle channel 126 is arranged on the outside 120, in particular on the outer surface 124 of the valve cage 100. Alternatively, it is conceivable for the valve cage 100 to comprise multiple additional throttle channels 126. For example, it is conceivable for the valve cage 100 to comprise two additional throttle channels 126 which, when viewed along the axial direction a, are spaced at a substantially equal minimum distance from the axis of symmetry AS, or three additional throttle channels 126, wherein one of the three additional throttle channels 126, when viewed along the axial direction a, extends substantially on or around the axis of symmetry AS, and two of the three additional throttle channels 126, when viewed along the axial direction a, are spaced at a substantially equal minimum distance from the axis of symmetry AS. Alternatively or additionally, it is conceivable for the additional throttle channel 126 to have a curved, coiled, for example helical or sharply bent basic shape.

However, it is also conceivable for the at least one additional throttle channel 126 to be of an at least substantially straight design. Alternatively or additionally, it is conceivable for an outlet opening of the additional throttle channel 126 to form an outflow edge 122, wherein in particular the outlet opening borders on at least one of the outer contour portions 112.

LIST OF REFERENCE SIGNS

- 10 control valve
- 12 valve housing
- 14 valve inlet
- 16 valve outlet
- 18 valve element
- 20 valve seat
- 100 valve cage
- 104 throttle channel
- 106 inlet opening
- 108 channel portion
- 110 outlet opening
- 112 arcuate outer contour portion
- 114 step
- 116 slot
- 118 outer contour
- 120 outer side
- 122 outflow edge
- 124 external surface
- 126 additional throttle channel
- a axial direction
- r radial direction
- u circumferential direction
- S flow direction
- AS symmetry axis
- AB outflow direction

The invention claimed is:

1. A valve cage for a control valve, comprising a plurality of throttle channels which extend from an inner contour of the valve cage to its outer contour and penetrate the valve cage, each throttle channel of the plurality of throttle channels having an inlet opening on an inner contour side and an outlet opening on an outer contour side, when viewed in a flow direction(S), wherein, when viewed in a circumferential direction (u), the valve cage has a plurality of arcuate outer contour portions which are each separated from one another via a step acting as a tear-off edge in relation to a respective lateral surface of the plurality of arcuate outer contour portions aligned in a radial direction, and in that the plurality of throttle channels are arranged to extend such that the outlet openings of the plurality of throttle channels on the outer contour side are arranged in the step between two outer contour portions.

2. A valve cage according to claim 1, wherein starting from their inlet openings on the inner contour side to the outlet openings on the outer contour side—the plurality of throttle channels are designed to have a curved course.

3. A valve cage according to claim 1, wherein channel portions of the plurality of throttle channels are circular in cross-section.

4. A valve cage according to claim 1, wherein channel portions of the plurality of throttle channels are designed to continuously increase in cross-section starting from the inlet openings to the outlet openings.

5. A valve cage according to claim 1, wherein channel portions of the plurality of throttle channels are designed to be essentially of the same length.

6. A valve cage according to claim 1, wherein a substantially hollow-cylindrical basic shape with an outer contour which is at least substantially circular when viewed along an axial direction (a), at least one of the outlet openings of the throttle channels and the steps acting in each case as a tear-off edge being arranged substantially on the outer contour of the valve cage when viewed along the axial direction (a).

7. A valve cage according to claim 1, wherein at least one additional throttle channel is formed to be essentially symmetrically with respect to an axis of symmetry of the valve cage and arranged at a distance from the steps and the plurality of throttle channels, wherein the at least one additional throttle channel extends from an inner side of the valve cage to an outer side of the valve cage formed in a downstream direction (AB), wherein the at least one additional throttle channel is provided to generate a flow directed in the downstream direction (AB).

8. A valve cage according to claim 1, wherein the valve cage is manufactured using a casting process.

9. A valve cage according to claim 1, wherein the valve cage is made of a metallic material.

10. A valve cage according to claim 1, wherein the plurality of throttle channels are each bent in an outflow direction (AB), with the valve cage having at least one outflow edge arranged on an outer side of the valve cage, which outflow edge is formed in the outflow direction (AB), which, viewed along a circumferential direction, delimits at least one of the outer contour portions and is arranged at a distance from the steps, the outflow edge preferably being provided to cause a flow guided along a respective outer contour portion of the plurality of arcuate outer contour portions to tear off in the downstream direction (AB).

11. A valve cage according to claim 10, wherein two outflow edges are arranged on the outer contour side of the valve cage, which is formed in the outflow direction (AB), which outflow edges each delimit one of the plurality of outer contour portions when viewed along the circumferential direction (u) and together delimit, in particular on two opposite sides, an outer surface of the valve cage, which is formed angled away from the plurality of outer contour portions via the two outflow edges.

12. A valve cage according to claim 1, wherein the valve cage is produced in layers by an additive manufacturing process.

13. A valve cage according to claim 12, wherein the additive manufacturing process is a laser sintering process or a laser melting process.

14. A valve cage according to claim 1, wherein a plurality of outlet openings arranged in series in an axial direction are arranged in the step between two outer contour portions.

15. A valve cage according to claim 14, wherein the outlet openings arranged in a row are each aligned tangentially adjacent to an adjoining arcuate outer contour portion when viewed in the flow direction.

16. A valve cage according to claim 14, wherein a slot extending in the axial direction (a) is formed in the step, with the outlet openings arranged in series opening into this slot which is aligned tangentially adjacent to an adjoining arcuate outer contour portion when viewed in the flow direction (S).

17. A valve cage according to claim 1, wherein, when viewed in the circumferential direction (u), the valve cage has an even number (n) of steps and arcuate outer contour portions.

18. A valve cage according to claim 17, wherein the following applies for the number (n) of steps and arcuate outer contour portions:

$$6 \leq \text{number } (n) \leq 40.$$

19. A valve cage according to claim 17, wherein the n arcuate outer contour portions and the n steps are arranged to be axially symmetric to an axis of symmetry (AS) aligned perpendicular to a direction of extension of the valve cage.

20. A control valve, comprising a valve housing with a valve inlet and a valve outlet, a valve cage disposed between the valve inlet and valve outlet, and a valve element which is displaceably mounted in the valve housing and interacts with the valve cage, wherein the valve cage includes a plurality of throttle channels which extend from an inner contour of the valve cage to its outer contour and penetrate the valve cage, each throttle channel of the plurality of throttle channels having an inlet opening on an inner contour side and an outlet opening on an outer contour side, when viewed in a flow direction(S), wherein, when viewed in a circumferential direction (u), the valve cage has a plurality of arcuate outer contour portions which are each separated from one another via a step acting as a tear-off edge in relation to a respective lateral surface of the plurality of outer contour portions aligned in a radial direction, and in that the plurality of throttle channels are arranged to extend such that the outlet openings of the plurality of throttle channels on the outer contour side are arranged in the step between two outer contour portions.

\* \* \* \* \*